350-271.
08-15-72  XR  3,684,386  SR

United States Patent
Noll

[15] 3,684,386
[45] Aug. 15, 1972

[54] FLOW CELL HOLDER AND FLOW CELL FOR USE THEREWITH

[72] Inventor: Hans Noll, 2665 Orrington Ave., Evanston, Ill. 60201

[22] Filed: Sept. 11, 1970

[21] Appl. No.: 71,595

Related U.S. Application Data

[63] Continuation-in-part of Ser. No. 707,063, Feb. 21, 1968, abandoned.

[52] U.S. Cl. .................................. 356/246, 350/271
[51] Int. Cl. ........................................... G01n 11/10
[58] Field of Search ............. 356/244, 246, 102–104, 356/207–208, 39, 181–186; 250/218; 350/271, 272

[56] References Cited

UNITED STATES PATENTS

| | | | |
|---|---|---|---|
| 3,584,964 | 6/1971 | Nejame, Jr. | 356/246 X |
| 3,319,512 | 5/1967 | Isreeli | 356/246 X |
| 2,334,329 | 11/1943 | Isaacson | 350/271 X |
| 2,485,089 | 10/1949 | Fassin | 350/271 |
| 2,959,094 | 11/1960 | Kosma | 350/272 X |
| 2,964,998 | 12/1960 | Middlestadt | 350/271 |
| 1,806,621 | 5/1931 | Forrest | 356/183 |
| 2,247,008 | 6/1941 | Assmus | 356/182 |
| 3,286,583 | 11/1966 | Ferrari | 356/246 |
| 3,501,242 | 3/1970 | DeMey, II et al. | 356/246 |

FOREIGN PATENTS OR APPLICATIONS

819,484   9/1959   Great Britain ............. 356/181

*Primary Examiner*—Ronald L. Wibert
*Assistant Examiner*—V. P. McGraw
*Attorney*—Richard E. Alexander, Thomas W. Speckman, David D. Kaufman and Norando Berrettini

[57] ABSTRACT

Flow cell holder having an adjustable aperture to be disposed in the light beam between a light source and a light path intersecting its fluid path and the flow cell being attached detachably to the holder with its light path rearwardly of the aperture and in the light path when the holder is in use, the holder preferably incorporating means of temperature control.

4 Claims, 6 Drawing Figures

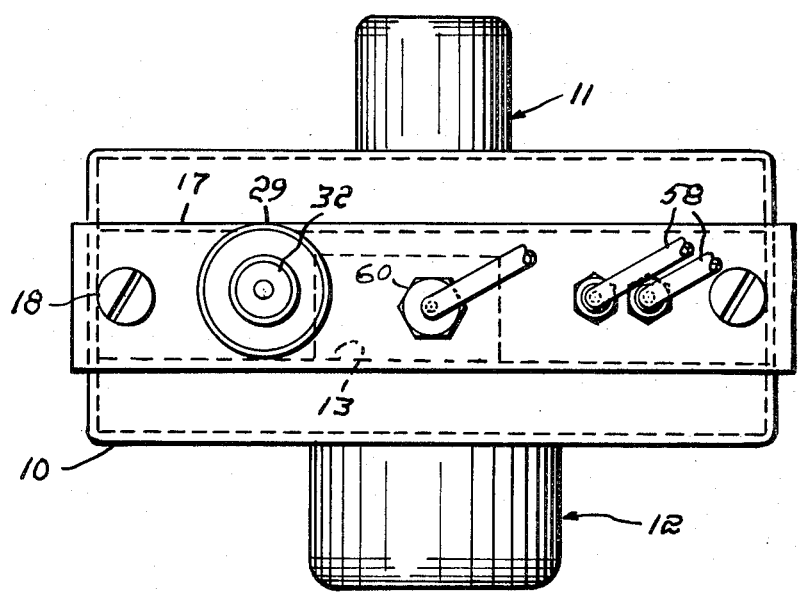

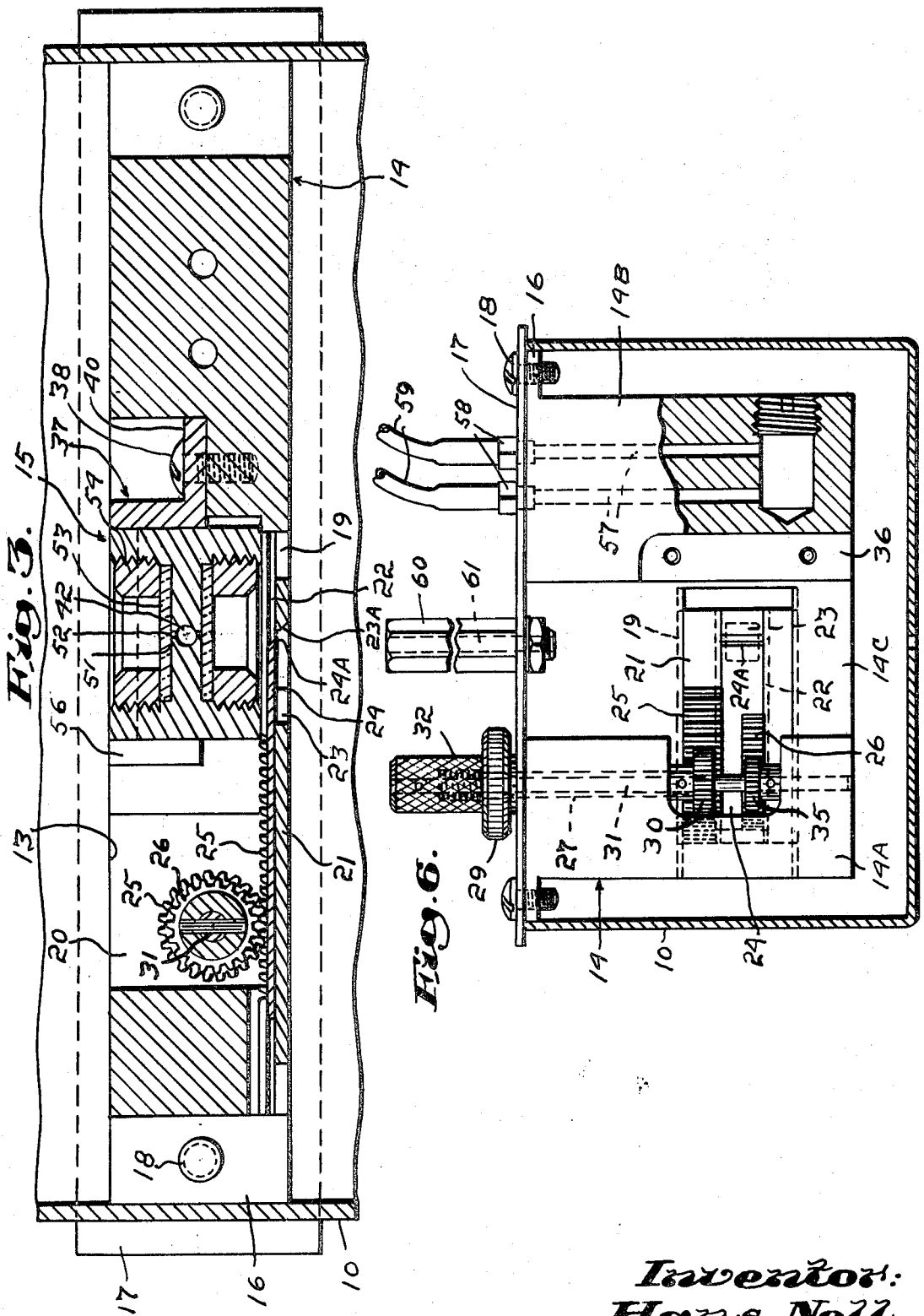

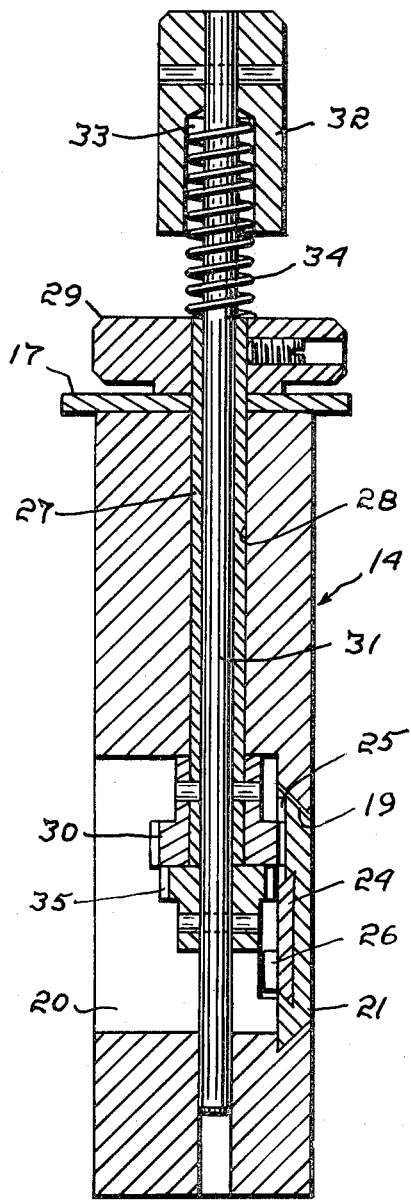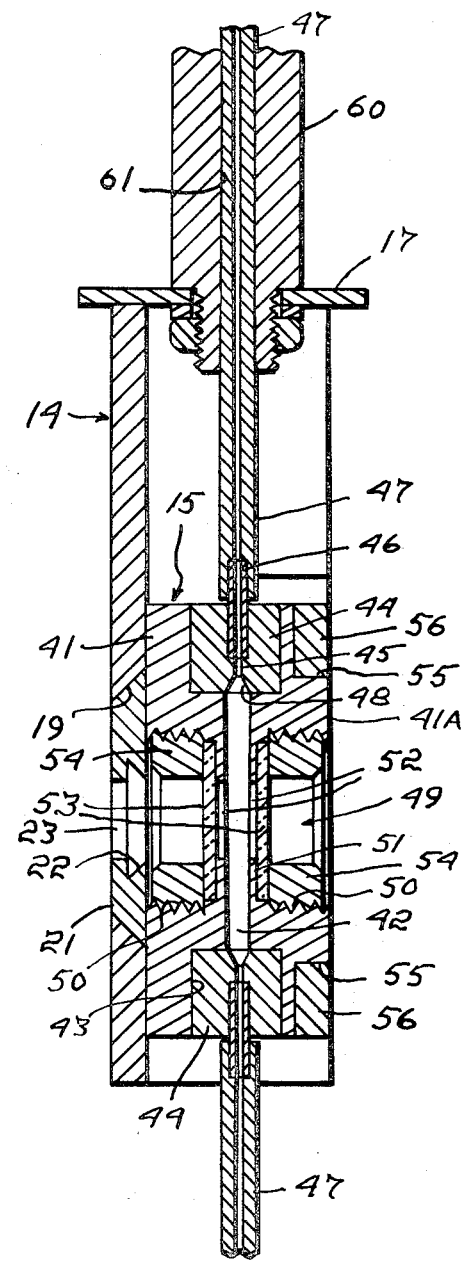

FLOW CELL HOLDER AND FLOW CELL FOR USE THEREWITH

The present invention relates to flow cell holders and to flow cells for use therewith. The present application is a continuation-in-part of my co-pending application Ser. No. 707,063, filed Feb. 21, 1968 and now abandoned.

In many applications requiring continuous spectrophotometric assay of solutions, in particular for the purpose of monitoring the separation of components in partition processes such as chromatography, electrophoresis or ultracentrifugation, a flow cell is introduced into a fluid conduit and supported in a chamber in such a position that a light beam between a light source and a light responsive sensor includes the light path of the flow cell, the light path intersecting the fluid passage thereof. In such apparatus, there is a light aperture between the light source and the fluid passage and both its position and its dimensions are important.

The invention is primarily concerned with the automatic scanning of continuously flowing sucrose density gradients using commercial spectrophotometers. To permit the effective scanning of narrow, closely spaced bands of molecules separated by centrifugation through a sucrose gradient, the volume of the flow cell must be small and the flow strictly non-turbulent. In monitoring viscous fluids, the slightest turbulence causes local changes in the refraction index and hence optical noise. Even in a cell of ideal hydrodynamic shape, there is some optical noise because of laminar flow along its side walls.

A principal objective of the present invention is, accordingly, to provide a flow cell holder having an aperture to confine the light beam to the center portion of the stream that is adjustable as to size with means to secure a flow cell with its light path behind the aperture and with means to vary the position of the aperture and of the flow cell.

Another objective of the invention is to provide a flow cell holder having an opening with a first member slidably carried by the holder for movement transversely of the opening and provided with a window and a second member slidable relative to the first member and the window and including a window-shielding portion adjustable to establish therewith a light aperture of desired dimensions, the second member preferably being slidably carried by the first member, the holder including manually operable means to adjust the positions of the members, preferably both together and separately.

Yet another objective of the invention is to provide a flow cell clamp adapted to clamp a flow cell to the holder with the clamp being adjustable relative thereto.

Still another objective of the invention is to provide a flow cell having shouldered ends on its face that is to be disposed towards the light aperture. The shouldered ends are held by the clamp and provide an intermediate portion cooperating with the clamp to prevent endwise movement of the flow cell.

Yet another objective of the invention is to provide the holder with cooling means, preferably a conduit for a coolant extending through the holder adjacent the surface to which the flow cell is clamped.

In the accompanying drawings, there is shown an illustrative embodiment of the invention from which these and other of its objectives, novel features, and advantages will be readily apparent.

In the drawings:

FIG. 1 is a top plan view of a flow cell supported by a holder in a chamber between a light source and a light responsive sensor;

FIG. 2 is a vertical section taken transversely of the chamber on the light sensor side of the holder;

FIG. 3 is a section, on a substantially increased scale, taken approximately along the indicated lines 3—3 of FIG. 2;

FIG. 4 is a section on the scale of FIG. 3 and taken approximately along the indicated lines 4—4 of FIG. 2;

FIG. 5 is a section, on the scale of FIGS. 3 and 4, taken approximately along the indicated lines 5—5 of FIG. 2; and FIG. 6 is a view similar to FIG. 2 but with the parts arranged to adjust the width of the aperture and the flow cell and clamp removed.

In the drawings, the chamber 10 of spectrophotometer apparatus is shown as having a light responsive sensor, generally indicated at 11 to which a beam of light is directed from a generally indicated light source 12. The chamber 10 has an entrance slot 13 extending transversely of the light beam between the light source and the light sensor to enable the holder, generally indicated at 14, to be supported within the chamber 10. The holder 14 has a flow cell, generally indicated at 15, attached thereto in a predetermined position relative to the light beam when the holder 14 is in use.

The holder 14 has end shoulders 16 to which a support 17 is anchored by screws 18. The holder 14, in the plane of its shoulders 16 is shaped and dimensioned to be a snug fit in the entrance slot 13 when the support 17 is seated on the margins thereof.

The holder 14 has a central channel extending vertically of its side that is to be disposed towards the light sensor 11 and the channel defines end portions 14A and 14B and an intermediate wall portion 14C. The side of the holder 14 that is to be disposed towards the light source 12 is a plane surface and has a slideway 19 extending transversely from the outer edge of the end portion 14A across and opening through the wall portion 14C and also into a recess 20 in the end portion 14A.

A first slide 21 is slidably supported in the slideway 19 and has a slideway 22 extending lengthwise of its face that is to be disposed towards the light sensor 11 and a rectangular window 23 adjacent the inner end for the light beam. A second slide 24 is slidably supported by the slideway 22 to enable it to screen the window 23 to provide an aperture in the light path in the form of a vertical slit of a desired width. The slit-defining edges of the window 23 and of the slide 24 are bevelled as at 23A and 24A, respectively, to eliminate optical noise that might otherwise be detectable by the light sensor 11.

The slides 21 and 24 include rack portions 25 and 26, respectively. A hollow shaft 27, vertically supported in a bore 28 by the end portion 14A, has a knob 29 on its upper end. The other end of the shaft 27 is exposed in the recess 20 and there provided with a pinion 30 in mesh with the rack portion 25 of the slide 21 so that by turning the knob 29 the position of the window 23 may be shifted laterally, the slight 24 normally moving with the slide 21. A shaft 31, slidably confined within and rotatable independently of the shaft 27, has a knob 32 on its upper end provided with a downwardly opening socket 33, best seen in FIG. 4 confining one end of a coiled spring 34 whose other end bears against the knob 29 thus to yieldably maintain the shaft 31 in a elevated position in which its pinion 35, adjacent its lower end and exposed in the recess 20, is held out of engagement with the rack portion 26 of the slide 24. By depressing the knob 32 until the pinion 35 meshes with the rack portion 26 and then turning the knob 32, the edge 24A of the slide 24 may be positioned relative to the window edge 23A to establish a desired aperture size. See FIG. 6.

The holder end portion 14B has a recess opening into the central, vertical channel to establish a shelf 36 to which a flow cell clamp, generally indicated at 37, is detachably secured as by clamping screws 38 extending through open-ended slots 39 in its attaching flange 40, see FIGS. 2 and 3.

The flow cell 15 is shown as having a body 41 of rectangular cross section and is provided with a fluid passage 42 of circular cross section effecting communication between sockets 43 in the ends of the body 41. Inserts 44 are fixed in the sockets 43 and each includes a port 45 having a fitting 46 at its outer end to receive an end of a fluid conduit section 47 and an inner end 48 outwardly tapering to the diameter of the fluid passage 42.

A generally indicated light path 49 intersects the fluid passage 42 and includes, as may best be seen in FIG. 5, threaded sockets 50 of a depth leaving a thin web 51 between it and the fluid passage, each web 51 having a central opening 52 and having a window 53 seated and sealed against it by an annular nut 54.

The face of the flow cell body 41 that is to be disposed towards the light sensor 11 has a central portion 41A defined by shouldered ends 55 and the clamp 37 has a U-shaped arm 56 connected to each other and to the attaching flange 40. The arms 56 fit the flow cell ends 55 and are so spaced as to receive and confine the shouldered central portion 41A between them. The flow cell 15 is thus clamped against the end portion 14B and held against the wall portion 14C with its position fixed except for adjustment permitted by the slots 38 in the attaching flange 40 of the clamp 37.

As it is usually desired to control the temperature of the fluid, the end portion 14B has a U-shaped passage 57 to enable a thermostatically controlled heat exchange fluid coolant to be circulated therethrough to maintain the flow cell 15 clamped thereto at the desired temperature. Fittings 58 enable a temperature control conduit 59 to be connected thereto.

With this construction, the flow cell 15 is securely clamped to the holder 14 in a desired position. The position of its window 23 is adjusted to bring its edge 23A into a desired position relative to the light path 49. The slide 24 may then be adjusted to bring its edge 24A into desired relation to the window edge 23A to establish an aperture of desired dimensions in the light beam, the aperture being in alignment with the light path 49 of the flow cell 15 and being of a smaller size than the openings 52 through the webs 51.

Holders in accordance with the invention are particularly well suited for use in systems where the flow rate through the fluid passage is low, say 0 – 6 ML. per minute, for example. With such flow rates, the inner diameter of the tubing and for the fluid conduit is small, typically in the approximate range of from 0.055 to 0.080 inches. It will be noted that the flow cells are held with their fluid passages vertically and the direction of flow may be upwards or downwards. In practice, the tubing of the fluid conduit is straight for a sufficient distance above and below the holder to avoid bends that would cause detectable turbulence. To this end, a lifter 60 is attached to the support 17 and is provided with an axial passage 61 for the upwardly extending conduit section 47.

I claim:

1. A flow cell for connecting sections of a conduit and adapted to be positioned between a light source and a light sensor, said cell comprising a body of rectangular section, having an elongated fluid passage provided with a port at each end for connection with said sections, and a pair of aligned, elongated windows formed in opposed faces of said body extending lengthwise of the passage and providing a light path intersecting an intermediate part of the fluid passage, said body including rabbets on one of said opposed faces extending transversely of the elongated window formed therein, and clamp means associated with said rabbets whereby said flow cell can be aligned relative to said light source and said light sensor.

2. A flow cell and holder assembly for use in spectrophotometric analysis comprising:
   a flow cell having a small-diameter elongated fluid passage and a pair of diametrically opposed openings providing a light path transverse to said fluid passage;
   a holder having an opaque wall and means for supporting the flow cell therein with the fluid passage parallel to said wall;
   an opaque slide having a window formed therethrough mounted in a slideway formed in said wall;
   a second opaque slide having a longitudinal leading edge mounted in a slideway formed in said first slide;
   said leading edge cooperating with an edge of said window to define the width thereof;
   first adjustment means for laterally moving said first and second slides simultaneously to shift the window with relation to the fluid passage; and
   second adjustment means for laterally moving the second slide alone to vary the width of said window.

3. An assembly according to claim 2 wherein each of said edges comprises a tapered knife edge.

4. An assembly according to claim 2 wherein said first adjustment means comprises a rack carried by the first slide and a pinion cooperating therewith to move said first and second slides as a unit; and said second adjustment means comprises a rack carried by said second slide and a pinion cooperating therewith for moving said second slide alone.

* * * * *